3,788,871
PEARLESCENT PIGMENT
Norbert V. Mullio, Brooklyn, N.Y., assignor to
Whittaker Corporation
No Drawing. Filed Mar. 22, 1971, Ser. No. 127,016
Int. Cl. C09c 1/00
U.S. Cl. 106—291
14 Claims

ABSTRACT OF THE DISCLOSURE

Mica platelets are coated with bismuth oxychloride crystals to provide pearlescent pigments which are especially useful in cosmetic applications. The pigments are produced by impregnating mica platelets with hydrochloric acid, followed by hydrolysis of bismuth trichloride in the presence of the platelets. The hydrolysis reaction is effected while the impregnated platelets are suspended in an aqueous crystallization medium, and hydrolysis results in the formation of bismuth oxychloride crystals which deposit on the surface of the mica. In preferred embodiments of the process, bismuth trichloride is contained in the hydrochloric acid with which the mica is impregnated. In comparison to conventional bismuth oxychloride pigments which contain no mica, these new products are superior in many respects, and equivalent pearlescence and opacity can be provided by a substantially lesser amount of bismuth oxychloride.

BACKGROUND OF THE INVENTION

This invention relates to nacreous or pearlescent pigments. More specifically it relates to novel pearlescent pigments which consist of bismuth oxychloride crystals attached to tiny platelets of mica.

The term "pearl essence" refers to a composition prepared from minute guanine and hypoxanthine crystals which are extracted from the skin and scales of certain fish. This "natural pearl essence" can be incorporated into nitrocellulose or methyl methacrylate to provide artificial pearls or buttons, jewelery, decorative finishes, and the like which resemble real pearl or mother-of-pearl. In other applications, natural pearl essence is mixed with cosmetic vehicles to provide lipsticks, skin powders, nail polishes, eye shadow powders, hair sprays, and the like which are characterized by a pearly luster. Since the recovery of natural pearl essence is a lengthy and costly process, it has in the large part been replaced by synthetically produced pigments such as basic lead carbonate, bismuth oxychloride, mica which has been coated with titanium dioxide, lead hydrogen arsenate, and lead hydrogen phosphate.

The most popular synthetic pearlescent pigment for cosmetic applications is bismuth oxychloride since it is nontoxic and gives a soft, aesthetic sheen to skin, nails, or hair. Classically, pearlescent bismuth oxychloride is produced by hydrolysis of bismuth trichloride. According to Greenstein in his article "Nacreous Pigments and Their Properties" (Proceedings of Scientific Section, The Toilet Goods Association, No. 45, May 1966) pearlescent bismuth oxychloride has a crystal diameter within the range of about 5 to about 40 microns, a refractive index of 2.15, and a specific gravity of 7.72.

In spite of its popularity in producing cosmetic preparations bismuth oxychloride pigments are, in some respects, less than desirable. Most particularly they are very expensive, and because of their high specific gravity they are difficult to suspend in liquid or pasty vehicles such as a nail polish or lipstick base. If dispersion is poor, unsightly streaks will show when the preparation is applied. Furthermore, cosmetic powders into which the pigment is incorporated are sometimes inclined to pack, and in such a case they can be difficult to pick up on a brush or puff for smooth and uniform application to the skin.

SUMMARY OF THE INVENTION

It is therefore an object of this invention to provide a new pearlescent pigment which is especially useful in cosmetic applications.

Another object of this invention is to maximize the advantages of bismuth oxychloride as a pearlescent pigment while reducing the cost of its use to accomplish a specific result.

Yet another object of this invention is to provide a pearlescent pigment which utilizes bismuth oxychloride for a pearlescent effect, but which has a much lower specific gravity than bismuth oxychloride per se.

Still another object of this invention is to provide a pearlescent pigment which utilizes bismuth oxychloride for a pearlescent effect, but which has a refractive index which is substantially the same as that of natural pearl essence.

Other objects and advantages of the present invention will become apparent from the following description thereof and the appended claims.

By means of the present process bismuth oxychloride is formed as crystalline deposits on tiny platelets of mica to provide a synthetic nacreous pigment having pearlescence and opacity which approximates that of bismuth oxychloride pigments which have not been deposited on a substrate in a similar fashion. Bismuth oxychloride coated mica platelets produced in accordance with this invention have a diameter within the range of about 10 to about 100 microns and in more preferable instances have a mean diameter within the range of about 15 to about 75 microns and a mean thickness within the range of about 3 to about 24 microns.

To produce the pigment products of this invention, mica platelets are first impregnated with hydrochloric acid. Subsequently, bismuth trichloride is hydrolyzed in the presence of the acid impregnated platelets while they are suspended in an aqueous crystallization medium. Hydrolysis of the bismuth trichloride results in formation of bismuth oxychloride crystals which tightly attach themselves to the mica platelets and thus form as deposits on the platelet surfaces. The resulting bismuth oxychloride coated mica platelets are then separated from the crystallization medium. After washing with water they may be dried or else flushed into a suitable organic medium such as castor oil or mineral oil.

In accordance with the present process, the hydrochloric acid with which the mica platelets are impregnated may or may not contain bismuth trichloride. In other words, the mica platelets may first be impregnated with a relatively dilute solution of hydrochloric acid followed by combination thereafter with a solution of bismuth trichloride in hydrochloric acid; or, the mica platelets may first be impregnated with a solution of bismuth trichloride dissolved in hydrochloric acid followed by combination thereafter with a relatively dilute aqueous solution of hydrochloric acid. In either case the mica platelets are first impregnated with hydrochloric acid, and bismuth trichloride is hydrolyzed while the impregnated platelets are suspended in an aqueous crystallization medium. It will also be apparent that conditions in the crystallization medium, such as pH and temperature, can be established whereby hydrolysis and crystallization occur more or less automatically without resort to other additives such as alkali, amines, or other bases. Accordingly, crystal growth of the bismuth oxychloride occurs over the surfaces of the mica platelets, accompanied by ingrowth of bismuth oxychloride into crevices in the platelets, thus providing a tightly rooted bond between the mica and the crystals.

Dissolution of bismuth trichloride in the hydrochloric acid may be accomplished by any convenient route, e.g. by direct addition to the acid since it is readily soluble therein. Aternatively, bismuth nitrate can be added to an excess of concentrated hydrochloric acid, and this results in formation of bismuth trichloride which dissolves in the remaining acid.

In accordance with preferred embodiments of the invention, the pearlescent pigment product has a refractive index within the range of about 1.75 to about 1.90, which is near or about the same as is exhibited by natural pearl essence, i.e. 1.85. In addition, the product will have a specific gravity within the range of about 4.5 to about 6.5, which is substantially less than that of conventional bismuth oxychloride pigments which have a specific gravity of about 7.70 to about 8.10.

The pigments of the present invention are usually economical since considerably less bismuth oxychloride is required to accomplish a desirable result, e.g. approximately equivalent pearlescence and opacity can be provided by an amount of bismuth oxychloride which is only about 50%–80% of the usual amount.

DESCRIPTION OF PREFERRED EMBODIMENTS

Any suitable type of mica can be employed in making the pigment provided that it does not have an objectionable color of its own which would detract from that desired of the finished product. White, wet-ground mica is preferred wherein the platelets have a particle size within the range of about 10 to about 100 microns. More preferably, substantially all of the platelets should have a mean diameter below about 75 microns while at least about 85 percent thereof should have a mean diameter below about 45 microns and a thickness within the range of about 0.1 to about 8 microns.

The coated-mica pigment of the present invention can be produced by either of two processes. In one of these processes the mica platelets are first soaked in a relatively diulte aqueous soution of hydrochloric acid in order to impregnate the platelets with the acid. Subsequently the slurry of mica platelets in the acid solution is combined with an agitated solution of bismuth trichloride dissolved in relatively concentrated hydrochloric acid, thus effecting hydrolysis of the bismuth trichloride and coating of the mica platelets with bismuth oxychloride.

In another and more preferred method of forming the pigment of this invention, mica platelets are first soaked in a solution of bismuth trichloride dissolved in relatively concentrated hydrochloric acid, followed by combination of the impregnated platelets with an aqueous crystallization medium, such as a relatively dilute aqueous solution of hydrochloric acid, thus effecting hydrolysis of the bismuth trichloride and formation of bismuth oxychloride coated mica platelets.

In either of the aforementioned processes, it is preferable that a pH within the range of about 2 to about 4.5 be established during hydrolysis of the bismuth trichloride. It is also preferable that the mixture be maintained at about 50° C. to about 100° C. durin gthe hydrolysis reaction. Generally speaking, pearlescence and opacity of the pigment increase as the crystallization temperature is increased.

As previously indicated, the mica platelets are allowed to soak in a solution of hydrochloric acid for impregnation of the platelets with the acid prior to hydrolysis of the bismuth trichloride. The length of time over which the platelets should be soaked is subject to considerable variation and depends, among other things, upon the type of mica employed, the acid concentration, and the temperature of the bath. The acid-platelet mixture can, for instance, be allowed to stand overnight when the acid is dilute, but the soaking interval can be shortened considerably by using higher acid concentrations and by heating the mixture, e.g. the platelets can be satisfactorily impregnated in about 30 minutes at 60° C.–80° C. when employing a hydrochloric acid concentration of about 10–12 N. In any case, however, the particles should be soaked in the acid solution for at least about 15 to about 30 minutes prior to initiating hydrolysis of the bismuth trichloride. The soaking operation can be facilitated, of course, by agitation, e.g. by stirring.

After soaking, the slurry of impregnated mica platelets is combined with either water or bismuth trichloride in acid (depending on the method employed) for formation of bismuth oxychloride. Hydrolysis of the bismuth trichloride then commences and proceeds substantially to completion. Crystallization of the bismuth oxychloride should be allowed to proceed slowly by gradual cooling of the mixture. The ingredients can, for instance, be mixed at a temperature of about 70° C. and can then be allowed to cool over a period of about 30 minutes to a temperature of 50° C.

The amount of water employed in the crystallization step is variable, but the most desirable results are obtained with amounts which result in a mixture having a pH within the range of about 2.0 to about 4.5 upon combination of the crystallization reactants. Satisfactory pigments can be produced at a pH which is somewhat lower than about 2.0, but the yield of bismuth oxychloride is reduced. At a pH in excess of about 4.5, the quality of the pigment is deleteriously affected, probably by formation of bismuth hydroxide.

As previously indicated, dissolution of bismuth trichloride in the hydrochloric acid can be accomplished by any convenient route, such as by direct addition of bismuth oxychloride to the acid. However, it is oftentimes more convenient to form the bismuth trichloride within the hydrochloric acid medium by addition of bismuth nitrate (pentahydrate) to the acid:

(1) $(Bi(NO_3)_3 \cdot 5H_2O + 3HCl \rightarrow BiCl_3 + 3HNO_3 + 5H_2O$
(2) $BiCl_3 + H_2O \rightarrow BiOCl + 2HCl$ As will be more fully understood hereinafter, reaction (1) shown above is carried out in the presence of an excess of concentrated hydrochloric acid, thereby depressing an undesirable formation of bismuth hydroxide, while also preventing excessive formation of bismuth oxychloride prior to controlled hydrolysis in the presence of the impregnated mica platelets. Therefore, prior to hydrolysis, the concentration of hydrochloric acid in mixture with bismuth trichloride should be elevated, i.e. generally at least about 10 N.

The proportion of bismuth trichloride which can be placed into mixture with mica in the hydrochloric acid is subject to variation depending upon the amount of bismuth oxychloride which is to be deposited onto the platelets. In the present process the conversion of bismuth trichloride to the oxychloride can be practically equivalent to theoretical expectations. The most desirable results are usually obtained when the product contains from about 40 to about 70 weight percent of bismuth oxychloride, and more particularly when it contains about 50 weight percent. As a general rule, opacity of the pigment increases as the content of bismuth oxychloride is increased, but performance and economic advantages become substantially reduced when the bismuth oxychloride content exceeds about 70 weight percent. On the other hand, the development of pearlescence and opacity can be insufficient when the content of bismuth oxychloride is below about 40 weight percent.

The aqueous crystallization medium in which the bismuth trichloride is hydrolyzed is preferably agitated, and is also preferably at least slightly acidified when combined with an acidic solution of bismuth trichloride. When adding a slurry of mica platelets to water when the platelets have been soaked in a solution of bismuth trichloride in hydrochloric acid, the water can, therefore, be slightly acidified beforehand with hydrochloric acid, e.g. to an acid concentration of at least about 0.05 N.

The extent to which the mixture is agitated during crystallization can influence the shade of the pigment product, e.g. darker shades which are, for instance, preferable in eye shadow and hair spray preparations result from increased agitation.

From the foregoing description it will be appreciated that the pearlescence, opacity, and shading of pigments which can be produced in accordance with the present invention are subject to variation. The desired combination of these features can differ from one application to the next, but desirable combinations can be arrived at through simple experimentation by one skilled in the art while using the teaching of this disclosure as a guideline.

After crystallization of the bismuth oxychloride is completed, the coated mica platelets can be separated from the liquid crystallization medium by any convenient means e.g. by centrifugation. The coated platelets should also be washed for removal of acid. The washed crystals can then be dehydrated by any suitable means, and an organic drying agent such as methanol can be employed to expedite the drying process. When preferred, a liquid or pasty product can be provided by "flushing" the pigment from an aqueous medium into a suitable organic medium such as castor oil or mineral oil.

It should also be pointed out that water which is used in the present process should be demineralized, by distillation or ion exchange, in order to remove minerals and other foreign matter which would be deleterious to the quality of the pigment product.

Mica platelets which have been coated in accordance with the present process have a coating of bismuth oxychloride crystals on each face of the platelet. To particular advantage, the mean diameter of the bismuth oxychloride crystals can be within the range of about 1.5 to about 8 microns, and the mean thickness of the coating on each side of platelets can also be within the range of 1.5 to about 8 microns. Usually, there is little or no extension of the bismuth oxychloride coating beyond the faces of the platelets so that the diameter thereof will be about the same as the mica platelets prior to the coating thereof. As a consequence, the coated mica platelets of this invention will have a mean diameter within the range of about 10 to about 100 microns and more preferably will have a mean diameter below about 75 microns and a mean thickness within the range of about 3 to about 25 microns. Pigments wherein at least about 85 percent of the coated platelets have a diameter below about 45 microns are especially preferred.

In accordance with the present process, the bismuth oxychloride crystals are randomly deposited on the surfaces of the mica platelets, i.e. there is no definite orientation of the crystals on the mica substrate. It is assumed that this results from the fact that tight attachment of the crystals to the platelets occurs primarily through rooting of the crystals in crevices of the platelets. Still other crystals are attached to those which are rooted. Therefore, when the coated platelets are examined under a microscope, they will not in all cases appear to be completely covered by the crystals, and the thickness of the coating will be non-uniform, thereby giving a very rough appearance. At the same time, however, there is little evidence of independently existing bismuth oxychloride crystals, i.e. crystals which are not attached to the mica platelets either directly or through one or more other crystals.

During soaking of the mica platelets in the acid solution, some leaching of the mica no doubt occurs, and it is felt that this facilitates infiltration of bismuth trichloride into crevices in the platelets. As a consequence, hydrolysis of the bismuth trichloride not only occurs at the outermost surfaces of the platelets, but also within the crevices, thus forming crystal roots which provide a tight attachment of crystals to platelets, and the resulting pigment product can therefore withstand normal shipping, handling, and processing without excessive detachment of the crystals.

Ordinary physical blends of mica platelets and conventional bismuth oxychloride pigment crystals do not provide the same results as the bismuth oxychloride coated mica pigments of the present invention, since in ordinary blends the platelets of mica and the crystals of pigment operate independently of each other with respect to their optical properties and specific gravity, and to the extent that performance of the bismuth oxychloride as a pearlescent pigment is seriously impaired. For instance, the optical properties of the present pigments are the result of combining the mica with the bismuth oxychloride instead of a net effect which results from reflection of light by the mica platelets and the pigment crystals, each independently of the other. Furthermore, when the pigment crystals and the mica platelets are not attached to each other, each responds to its own specific gravity, and since the specific gravity of one is considerably different from that of the other, it is very difficult to effect and maintain a uniform dispersion of the two, e.g. there is a tendency for unattached bismuth oxychloride crystals to precipitate from a cosmetic vehicle whereas the mica platelets are more inclined to remain suspended within it.

It has also been observed that if bismuth oxychloride crystals are attached to the mica, but not firmly, such as by rooting of the crystals therein, the combination is not stable and can revert to a simple physical mixture during handling, shipping and processing, thus destroying the optical and density advantages which are available from firm attachment of the crystals to the platelets.

The invention will now be further explained by means of specific examples. Examples I–III provide details of highly preferred embodiments of the present process, but it will be understood that the invention is not limited to these examples alone.

Example I 50 grams of 20° Bé. hydrochloric acid and 40 grams of bismuth nitrate (pentahydrate) were added to 100 milliliters of water having a temperature of 78° C. 30 grams of white, wet-ground mica were added to the resulting solution. About 90 percent of the mica platelets had a mean diameter below about 45 microns and a thickness within the range of about 0.1 to about 8 microns. The slurry of mica platelets in the acid solution of bismuth trichloride was then stirred for 30 minutes, while maintaining the slurry at 78° C., to effect impregnation of the mica platelets with the solution.

To 2500 milliliters of deionized water under agitation at 78° C., and which had been acidified with 5 grams of 20° Bé. hydrochloric acid, the slurry of impregnated mica platelets in the acid solution was added at a constant rate which required 1.8 minutes for addition of the entire slurry. The agitation was continued until the mixture had cooled to 50° C., this having required 30 minutes, and resulted in hydrolysis of the bismuth trichloride and gradual crystallization of the bismuth oxychloride. At the end of this period, the resulting pigment was centrifuged and then was washed with deionized water until a pH of about 4.0 was reached. The pigment was then dried and 50 grams of fluffy, bismuth oxychloride coated mica platelets were recovered.

Analysis of this pigment revealed a bismuth oxychloride content of 40 weight percent, a specific gravity of 4.8 and a refractive index of 1.75. Microscopic examination showed that the vast majority of the bismuth oxychloride crystals were tightly attached to the mica platelets, there being little evidence of independent, unattached crystals. In excess of 85 percent of the bismuth oxychloride coated platelets had a mean diameter below about 45 microns and a mean thickness within the range of about 3 to about 24 microns. The mean diameter of the bismuth oxychloride crystals themselves was within the range of about 1.5 to about 8 microns. In bulk, the pigment particles had a lustrous, silvery pearlescent appearance.

Example II

Substantially the same reaction and pigment recovery procedures were used as were employed in Example I except that 25 grams of the same mica were slurried for impregnation in 120 milliliters af water to which 62.5 grams of 20° Bé. hydrochloric acid and 50 grams of bismuth nitrate (pentahydrate) had been added. Furthermore, the mica slurry was introduced into the acidified water at a constant rate which required 2.0 minutes for addition of the entire slurry. 50 grams of pearlescent pigment were recovered, and analysis revealed that it contained 50 weight percent of bismuth oxychloride, and that it had a specific gravity of 5.3 and a refractive index of 1.84.

Microscopic examination of this pigment showed that the coated platelets had substantially the same physical dimensions as those produced in Example I.

Example III

Substantially the same reaction and pigment recovery procedures were used as were employed in Example I except that 15 grams of the same mica were slurried for impregnation in 150 milliliters of water to which 87.5 grams of 20° Bé. hydrochloric acid and 70 grams of bismuth nitrate (pentahydrate) had been added. Furthermore, the mica slurry was introduced into the acidified water at a constant rate which required 2.5 minutes for addition of the entire slurry. 50 grams of pearlescent pigment were recovered, and analysis revealed that it contained 70 weight percent of bismuth oxychloride, and that it had a specific gravity of 6.3 and a refractive index of 1.87.

Microscopic examination of this pigment showed that the coated platelets and substantially the same physical dimensions as those produced in Example II.

Example IV

The pearlescent pigment of Example II was compounded into a tinted lipstick base at 14 weight percent solids concentration. This composite was then shaped into lipsticks. The pearlescence of this lipstick was much greater when compared to other lipsticks having the same formula except that they contained conventional bismuth oxychloride as the pigment, or else mica to which bismuth oxychloride had been only loosely attached.

Of the pigments produced in Examples I–III, the one which contained 50 weight percent of bismuth oxychloride was rated as having a mean optical quality between pearlescence and opacity. The pigment which contained 40 weight percent of bismuth oxychloride was somewhat more pearlescent and less opaque, while the sample which contained 70 weight percent of bismuth oxychloride was slightly less pearlescent and more opaque. This is not to be construed as detrimental, since it demonstrates the ability to control optical properties of the pigment, and it will be appreciated that formulators will sometimes desire more or less pearlescence or opacity depending upon the particular effect desired of the pigment.

Example V 5.0 grams of 20° Bé. hydrochloric acid and 30 grams white, wet-ground mica were added to 2500 milliliters of water. This mixture was maintained under agitation at 78° C. for three hours (Mixture A).

50 grams of 20° Bé. hydrochloric acid was added to 100 milliliters of water in a separate vessel and which had a temperature of 25° C. 40 grams of bismuth nitrate (pentahydrate) were then dissolved in this mixture (Mixture B).

Mixture B was added to Mixture A, under agitation, at a constant rate which required two minutes for addition of all of the mixture. Agitation was continued until the mixture had cooled to 50° C., this having required about 30 minutes, and resulted in hydrolysis of the bismuth trichloride and gradual crystallization of the bismuth oxychloride. At the end of this period the resulting pigment was centrifuged and then was washed with water until a pH of 4.0 was reached. The pigment was then dried and 50 grams of fluffy, bimuth oxychloride coated mica platelets were recovered.

Analysis of this pigment revealed a bismuth oxychloride content of 40 weight percent, a specific gravity of 4.8, and a refractive index of 1.75. Microscopic examination revealed that the pigment product was otherwise very similar to that produced in Example I.

The present invention has been described with reference to specific materials, proportions, conditions, properties, and like, but it will be understood that other embodiments will become apparent which are within the spirit and scope of the invention which is defined by the following claims.

Therefore, what is claimed is:

1. A process for producing a pearlescent pigment which comprises:
    (a) first impregnating mica platelets with hydrochloric acid by soaking the same therein for at least about 15 minutes;
    (b) then hydrolyzing bismuth trichloride in the presence of the resulting acid impregnated mica platelets at about 50°–100° C. while said platelets are suspended in an aqueous hydrochloric acid crystallization medium having a pH of about 2.0–4.5; and,
    (c) recovering a pearlescent pigment in the form of mica platelets having a coating of bismuth oxychloride deposited thereon.

2. The process of claim 1 wherein bismuth trichloride is dissolved in concentrated hydrochloric acid solution prior to combination with the impregnated mica platelets.

3. The process of claim 1 wherein said mica platelets are first impregnated with a solution of bismuth trichloride dissolved in concentrated hyrochloric acid, followed by combination of the resulting impregnated platelets with said aqueous crystallization medium.

4. The process of claim 1 in which the proportion of bismuth trichloride to mica platelets incorporated in said crystallization medium provides about 40 to about 70 weight percent of bismuth oxychloride upon separation of the resulting coated mica platelets from said medium.

5. The process of claim 4 wherein the coated mica platelets are subsequently washed with water.

6. The process of claim 4 wherein said bismuth trichloride is produced by dissolving bismuth nitrate in concentrated hydrochloric acid.

7. The process of claim 4 wherein said mica platelets have a mean diameter within the range of about 10 to about 100 microns prior to the coating thereof with bismuth oxychloride.

8. The process of claim 7 wherein said mica platelets have a mean diameter below about 75 microns and a mean thickness within the range of about 0.1 to about 8 microns.

9. The process of claim 7 wherein at least about 85 percent of said platelets have a mean diameter below about 45 microns.

10. The process of claim 2 wherein hydrochloric acid in which the bismuth trichloride is dissolved prior to combination with the impregnated mica platelets is at a concentration of at least about 10 N.

11. The process of claim 3 wherein the concentration of hydrochloric acid in said solution with which said platelets are impregnated is at least about 10 N.

12. The process of claim 3 wherein the aqueous crystallization medium is at least slightly acidified prior to combination with the impregnated mica platelets.

13. The process of claim 12 wherein the pH of said aqueous medium contains hydrochloric acid at a concentration of at least about 0.05 N.

14. The process of claim 1 wherein the concentration of hydrochloric acid in said solution with which said platelets are impregnated is at least about 0.05 N.

References Cited
UNITED STATES PATENTS

| | | | |
|---|---|---|---|
| 3,597,250 | 8/1971 | Rand, Jr. et al. | 106—291 |
| 2,974,053 | 3/1961 | Suchou | 106—291 |
| 3,087,828 | 4/1963 | Linton | 106—300 |

DELBERT E. GANTZ, Primary Examiner

J. W. HELLWEGE, Assistant Examiner

U.S. Cl. X.R.

106—308 B